United States Patent [19]

Rayborn, Sr. et al.

[11] Patent Number: 5,843,872
[45] Date of Patent: Dec. 1, 1998

[54] DRILLING FLUID SYSTEM AND RELATED METHODS

[76] Inventors: Jerry J. Rayborn, Sr.; John J. Rayborn, both of 30481 Hwy. 25, Franklinton, La. 70438

[21] Appl. No.: 974,405

[22] Filed: Nov. 19, 1997

[51] Int. Cl.⁶ .................................................. C09K 7/02
[52] U.S. Cl. .................. 507/106; 507/107; 507/126; 507/138; 507/139; 507/906; 507/140; 507/269
[58] Field of Search .................................... 507/106, 107, 507/126, 138, 139, 906, 140, 269

[56] References Cited

U.S. PATENT DOCUMENTS

| | | |
|---|---|---|
| 2,241,255 | 5/1941 | Garrison . |
| 2,316,967 | 4/1943 | Miller . |
| 2,316,968 | 4/1943 | Miller . |
| 2,605,222 | 7/1952 | Jones . |
| 2,773,031 | 12/1956 | Tailleur . |
| 2,773,670 | 12/1956 | Miller . |
| 2,805,991 | 9/1957 | Tailleur . |
| 2,812,161 | 11/1957 | Mayhew . |
| 2,854,214 | 9/1958 | McArthur et al. . |
| 2,858,270 | 10/1958 | Harrison . |
| 2,867,540 | 1/1959 | Harris . |
| 2,885,360 | 5/1959 | Haden et al. . |
| 3,089,846 | 5/1963 | Pitchford . |
| 3,215,628 | 11/1965 | Peacock . |
| 3,264,214 | 8/1966 | Stratton . |
| 3,314,489 | 4/1967 | Humphrey . |
| 3,322,668 | 5/1967 | Fontenot et al. . |
| 3,385,789 | 5/1968 | King . |
| 3,412,792 | 11/1968 | Parker . |
| 3,559,735 | 2/1971 | Corrin . |
| 3,618,664 | 11/1971 | Harvey . |
| 3,724,565 | 4/1973 | Kelly, Jr. . |
| 3,737,412 | 6/1973 | Marx et al. . |
| 3,788,406 | 1/1974 | Messenger . |
| 3,998,270 | 12/1976 | Rodewald . |
| 4,108,779 | 8/1978 | Carney . |
| 4,385,999 | 5/1983 | McCrary . |
| 4,391,329 | 7/1983 | Gallus . |
| 4,501,329 | 2/1985 | DePriester . |
| 4,514,308 | 4/1985 | Clampitt et al. . |
| 4,671,883 | 6/1987 | Connell et al. . |
| 4,957,557 | 9/1990 | Dimitri . |
| 5,114,597 | 5/1992 | Rayborn et al. ............... 507/126 |
| 5,114,598 | 5/1992 | Rayborn et al. ............... 507/126 |

OTHER PUBLICATIONS

Garrett, Robert L., *How about fish oil in your mud?*, Drilling and Completion Fluids, Nov., 1993.

Bimbo, Anthony P., *The Emerging Oil Industry.*, Journal of the American Oil Chemists Society, pp. 706–716, vol. 64/No. 5, May, 1987.

Bimbo, Anthony P. and Jane B. Crowther, *Marine oils: fishing for industrial uses.*, Inform, pp. 908–1001, vol. 3, No. 9, Sep., 1992.

*Primary Examiner*—Philip Tucker
*Attorney, Agent, or Firm*—Reed Smith Shaw & McClay LLP

[57] ABSTRACT

A drilling fluid system that combines a carbon black/asphaltite/lignite mixture with a fish oil/glycol mixture; and a method for manufacturing a drilling fluid system that could be utilized with pre-existing water based muds during drilling and excavating applications.

93 Claims, 2 Drawing Sheets

DRILLING FLUID SYSTEM AND RELATED METHODS

FIELD OF THE INVENTION

The present invention relates to a drilling fluid system that combines a carbon black/asphaltite/lignite mixture with a fish oil/glycol mixture. The drilling fluid system of the present invention provides enhanced lubricating, shale inhibiting and defoaming qualities, enhanced fluid loss properties, improved wall cake thickness, improved bore hole stability, and a significant reduction in the adhesion of cutting to the drill string.

BACKGROUND OF THE INVENTION

The drilling of oil and gas wells can be made more efficient if downtime is minimized and hole and drill string problems are eliminated. Drilling fluids or muds are commonly used in the drilling of oil and gas wells to address the above-mentioned problems. These drilling fluids serve numerous functions including: (1) cooling the drill bit; (2) lubricating the drill string; (3) cleaning the bore hole; (4) bringing the cuttings to the surface; (5) preventing cavings of the formation by providing hole stability; (6) controlling fluid loss into the formations; and (7) exerting pressure to the sides of the bore hole to prevent the entrance of liquids or gases into the bore hole from the formation being penetrated.

The drilling fluid must have a low fluid loss to prevent excessive loss of fluid into the formation by depositing an impervious filter cake on the sides of the bore hole. The thickness of the filter cake is usually directly proportional to the volume of fluid loss. Therefore, the lower the fluid loss, the thinner the filter cake. Maintaining the diameter of the bore hole being drilled is critical to a successful operation. If the fluid loss is high, then the wall cake will be thick and therefore, the desired diameter of the well bore will be reduced.

Fluid loss additives are commonly used to control the fluid loss and the wall cake thickness of oil and gas wells. The most commonly used fluid loss additives are bentonite clays, polymers, lignites, and surfactants.

Carbon black is basically pure carbon which exists in extremely small particle diameters of approximately 13 to 75 millimicrons. Carbon black particles have a high surface area. The surface area of a carbon black particle is approximately 25 to 500 square meters per gram and has an oil absorptive capacity of 45 to 300 cc per 100 grams.

Carbon black is organophilic and has an extremely high affinity for oils, phenols, alcohols, fatty acids, and other long carbon chain products normally used in drilling fluid.

Carbon black is insoluble and maintains its individual particle identity through mixing and handling procedures commonly used in the drilling mud industry. Carbon black will remain completely stable and finite at temperatures up to 3000° F. The hardness of carbon black, in addition to its high affinity for lubricating substances, makes it an excellent carrier to extremely tight fittings, such as a metal to metal contact. Coated with lubricant, the ultra-fine particle size penetrates openings and surfaces not normally penetrable with other solids in the drilling fluid system.

However, carbon black that has not been chemically treated is basically hydrophobic and will not readily mix with water or water based drilling fluids. Thus, it is difficult to use carbon black as an effective drilling fluid additive.

U.S. Pat. No. 5,114,597 which was assigned to the assignee of this present invention related to a process of manufacturing a drilling fluid containing carbon black in a dispersed state.

Gilsonite, a native asphalt occurring in vein deposits below the surface of the ground, greatly reduces fluid loss and wall cake thickness when properly incorporate with any water based drilling fluid. Gilsonite is commonly found in Utah and Colorado. Gilsonite and other asphaltic type materials penetrate shale pore spaces as a drill bit penetrates a formation. It is assumed that a plastic-flow mechanism will allow the asphaltite to extend into the pores of the shale, thus, reducing fluid loss or mud invasion with a tendency to bond the shale and prevent sloughing. Asphaltite plates out on the bore hole to thereby reduce fluid loss.

However, asphaltite is by nature extremely hydrophobic and will not readily mix with water or water-based drilling fluids. Thus, it is difficult to use asphaltite as an effective drilling fluid additive.

Attempts have been made to make asphaltite-based products more compatible with the drilling fluid. However, none of these attempts have been successful.

Moreover, in typical drilling mud systems, the asphaltic material is packaged in 50 pound bags and dumped into the mud hopper on the rig in amounts equaling from 1 to 50 pounds per barrel of mud. Since the asphaltic material is extremely hydrophobic, a surfactant is then added to the mud system in amounts of 0.5 to 10% by volume to make the asphaltite disperse or become water wet. However, this process is extremely expensive because the surfactant might be used up on other solid materials in the mud system, such as, barite, bentonite, and drilled solids.

Furthermore, the above-mentioned process is very expensive because it does not allow the asphaltite enough retention time with the aqueous phase of the drilling fluid to become dispersed or broken up into individual particles. Therefore, much of the material is lost over the rig shaker after the initial or first circulation through the well bore. Rig shakers can now be operated with shaker screens as fine as 250 mesh with 80–100 mesh being standard. With the above methods of adding asphaltite products dry to the drilling fluid, a conservative estimate of at least 10% or up to 90% of the asphaltite product is screened out and lost over the rig shaker after the first circulation.

U.S. Pat. No. 5,114,598 which was also assigned to the assignee of the present invention related to a process of manufacturing a drilling fluid containing asphaltite in a dispersed state.

Marine or fish oil is a versatile product and finds many applications in the food, feed and technical industries of the world. Like other fats and oils, fish oils consist of a mixture of triglycerides of various long-chain fatty acids with small amounts of mono- and diglycerides, free fatty acids and sterols. The fatty acids that characterize fish oils are similar to those in various vegetable oils and animal fats differing principally in their high proportions of long-chain polyunsaturated fatty acids with five and six double bonds. Marine oils differ among themselves in the percentage of fatty acids. Although the use of fish oil in drilling/completion fluids has been contemplated, there has been no teachings of how fish oils can be incorporated into drilling fluids with improved results. An article entitled "How about fish oil in your mud?" by Robert Garrett was published in *Drilling & Completion Fluids*, November, 1993 and discussed the need for biodegradable, low-toxicity and earth-friendly materials. However, the article did not discuss how fish oils could be implemented into a drilling fluid.

SUMMARY OF THE INVENTION

Accordingly, the object of the present invention is to provide a drilling fluid system that allows the drilling of gas and oil wells to be more efficient and economical.

Another object of the present invention is to provide a drilling fluid system that has excellent mud lubricity, minimized shale hydration, enhanced rate of penetration, and provides for a cleaner drill string, lower fluid loss and thinner filter cake.

Still another object of the present invention is to provide a drilling fluid system having the combination of a carbon black/asphaltite/lignite mixture and a fish oil/glycol mixture.

Another object of the present invention is to provide a carbon black/asphaltite/lignite dispersion which has an improved particle size distribution.

Yet another object of the present invention is to provide a drilling fluid system that can be utilized as a lubricant, defoamer and/or a shale inhibitor during drilling applications.

Still a further object of the invention is to provide a method of manufacturing a drilling fluid system with enhanced fluid loss properties, enhanced wall cake thickness, enhanced bore hole stability, enhanced temperature stability, enhanced defoaming qualities and enhanced film forming qualities to the drilling fluid.

A further object of the invention is to provide a method of manufacturing a new and improved drilling fluid system containing the combination of a mixture of carbon black/asphaltite/lignite in dispersion and a mixture of fish oil/glycol.

The present invention accordingly provides a drilling fluid system comprising: (a) a hydrophilic clay; (b) a pH controller; (c) a fluid loss controller; (d) a dispersant; (e) a mixture of carbon black/asphaltite/lignite and either a surfactant or dispersant; and (f) a mixture of a nonionic surfactant, an oil, an ester alcohol, and polypropylene glycol. In one embodiment of the invention, the drilling fluid system further comprises a weighting agent. The weighting agent can be barium sulfate, calcium carbonate, hematite, and other salts. In a further embodiment, the hydrophilic clay can be bentonite and other viscosifiers. The pH controller can be selected from a group consisting of caustic soda, potassium hydroxide, and sodium hydroxide. In a still further embodiment, the fluid loss controller can either be lignite or polyacrylamide. The dispersant can either be lignosulfonate or lignite.

The present invention also provides a drilling fluid system can be utilized with pre-existing mud and comprises the combination of (a) a mixture of carbon black/asphaltite/lignite and either a surfactant or dispersant and (b) a mixture of a nonionic surfactant, an oil, an ester alcohol, polypropylene glycol.

In one embodiment of the invention, the carbon black/asphaltite/lignite mixture can further comprise a chemical inhibitor. The chemical inhibitor can be selected from a group consisting of gypsum, lime, potassium chloride, potassium hydroxide, and calcium sulfate.

In another embodiment, the asphaltite of the carbon black/asphaltite/lignite mixture can be gilsonite.

In another embodiment, the surfactant in the carbon black/asphaltite/lignite mixture can be selected from a group consisting of phenols, alcohols, glycols and fatty acid type materials. The dispersant in this mixture can be potassium hydroxide, sodium hydroxide, and any lignite type materials.

In a further embodiment of the invention, the oil in the oil/glycol mixture is preferably fish oil and more preferably menhaden fish oil. The nonionic surfactant is preferably polyethoxylated glycol such as polyether polyol-poly (oxyethylene-oxy) propylene glycol; and the ester alcohol is preferably 2,2,4 trimethyl-1,3 pentanediol monoisobutyrate.

The present invention also provides a new and improved method of manufacturing a drilling fluid system which combines a carbon black/asphaltite/lignite mixture in a dispersed state and a fish oil/glycol mixture and the method comprises the steps of: (a) mixing water with a hydrophilic clay, a weighting agent, a pH controller, a fluid loss controller and a dispersant; (b) admixing a mixture of carbon black/asphaltite/lignite and/or either a surfactant or a dispersant to the other mixture in (a), and (c) admixing a mixture of a nonionic surfactant, an oil, an ester alcohol and polypropylene glycol to the mixture of (a) and (b).

In another embodiment, the carbon black/asphaltite mixture is prepared by (a) mixing a hydrophobic carbon black/asphaltite/lignite with either a surfactant or a dispersant and (b) shearing the mixture under a sufficiently high mechanical shear for a sufficient time to convert the hydrophobic carbon black/asphaltite into hydrophilic carbon black/asphaltite.

In a still further embodiment, the fish oil/glycol mixture is manufactured by admixing an ester alcohol, an oil, a nonionic surfactant, and a polyproplyene glycol.

In addition, the present invention also provides a method of manufacturing a drilling fluid system that can be utilized with a pre-existing water based mud during drilling and excavating applications. The method comprises the steps of: (a) preparing a mixture of carbon black, asphaltite, lignite, and either a surfactant or dispersant; (b) preparing a mixture of a nonionic surfactant, and oil, an ester alcohol and the polyproplyene glycol; and (c) adding the mixture of (a) and (b) to a pre-existing water based mud.

In the present invention, carbon black helps improve the bacterial degradation of hydrocarbons by forming microcells which allow greater surface area exposure for the bacteria to dissipate and thus destroy the hydrocarbon. It has been determined that a hydrocarbon sheen of any significant size on the surface of water is environmentally unacceptable due to the adverse effects on marine life. Almost all drilling fluids inadvertently contain a small percentage of a sheen forming hydrocarbon. This hydrocarbon could enter the drilling fluid as the drilling assembly penetrates a hydrocarbon laden sand or by simply adding it to the drilling fluid to obtain a specific benefit.

This phenomenon occurs due to the extremely small particle size of the carbon black and also due to the high absorptive properties of the carbon black.

BRIEF DESCRIPTION OF THE DRAWINGS

A more complete appreciation of the invention and many of the attendant advantages thereof will be understood by reference to the following detailed description when considered in conjunction with the accompanying drawings.

DETAILED DESCRIPTION OF THE INVENTION

Figure 1:
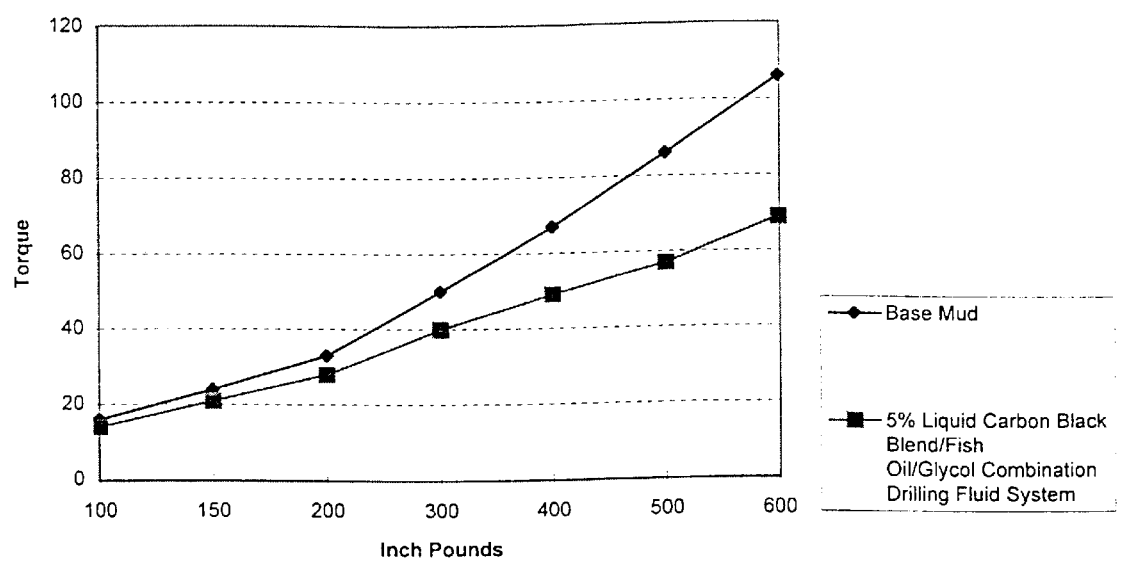
FIG. 1 depicts a graphical representation of base mud in contrast with a base mud containing 5% of the drilling fluid system of the present invention with torque readings on a 13.0 ppg mud.

Reference will now be made in detail to the presently preferred embodiments of the invention.

In accordance with the present invention, a drilling fluid system is provided which comprises a hydrophilic clay; a pH controller; a fluid loss controller; a dispersant; a mixture of carbon black/asphaltite/lignite and either a surfactant or a dispersant; and a mixture of a nonionic surfactant, an oil, an ester alcohol and polypropylene glycol.

In one embodiment of the invention, the drilling fluid system can further comprise a weighting agent. The weighting agent can be barium sulfate (barite), calcium carbonate, hematite, or other salts. The hydrophilic clay can be bentonite or other viscosifiers. The pH controller can be a caustic soda, potassium hydroxide, or sodium hydroxide. The fluid loss controller can be lignite or polyacrylamide. The dispersant of the drilling fluid system can either be lignosulfonate or lignite.

In another embodiment, the carbon black/asphaltite mixture of the drilling fluid system can further comprise a chemical inhibitor. The chemical inhibitor can be selected from a group consisting of gypsum, lime, potassium chloride, potassium hydroxide, and calcium sulfate.

In a further embodiment, the asphaltite of the carbon black/asphaltite/lignite mixture can be gilsonite. The surfactant of the carbon black/asphaltite/lignite mixture can be selected from a group consisting of phenols, alcohols, glycols, and fatty acid type materials and the dispersant can be any lignite type materials.

In yet another embodiment of the present invention, the nonionic surfactant of the oil/glycol mixture is a polyethoxylated glycol and is preferably polyether polyol-poly (oxyethylene-oxy) propylene glycol. The nonionic surfactant in the oil/glycol mixture can also be a polyethoxylated glycol selected from a group consisting of polybutylene glycol, polyethylene glycol, polypropylene glycol and mixtures thereof.

In still a further embodiment, the oil is preferably fish oil and more preferably menhaden fish oil. The oil in the oil/glycol mixture can be an animal oil, vegetable oil, mineral oil, synthetic oil, and mixtures thereof.

The ester alcohol is preferably 2,2,4 trimethyl-1,3 pentanediol monoisobutyrate. The ester alcohol can be any alcohol with a formula of $C_1-C_{16}$ with straight and/or branched chains.

In still another embodiment of the invention, the fish oil/glycol mixture comprises: a nonionic surfactant from about 1% to about 90% of the mixture, a fish oil from about 5% to about 90% of the mixture, an ester alcohol from about 1% to about 50% of the mixture, and polypropylene glycol from about 1% to about 75% of the fish oil/glycol mixture.

The carbon black/asphaltite mixture is from about 1% to about 10% of the drilling fluid system and preferably from about 2% to about 5% of the drilling fluid system. The fish oil/glycol mixture is from about 1% to about 10% of the drilling fluid system and preferably from about 2% to about 5% of the drilling fluid system.

In another embodiment, the carbon black/asphaltite mixture is 30–35 parts by weight of asphaltite, 15–20 parts by weight of carbon black and 5–90 parts by weight of a surfactant in the drilling fluid.

The present invention also provides a drilling fluid system that can be utilized with a pre-exiting water based mud during drilling and excavating applications. The system combines a mixture of carbon black/asphaltite/lignite and either a surfactant or a dispersant; and a mixture of nonionic surfactant, an oil, an ester alcohol and propylene glycol.

The present invention also provides a method of manufacturing a drilling fluid system which comprises the steps of (a) mixing water with a hydrophilic clay, a weighting agent, a pH controller, a fluid loss controller and a dispersant; (b) admixing a mixture of carbon black/asphaltite/lignite and either a surfactant or a dispersant to the mixture in (a); and (c) admixing a mixture of a nonionic surfactant, an oil, ester alcohol and a polypropylene glycol to the mixture of (a) and (b).

In one embodiment, the fish oil/glycol mixture is prepared by (1) admixing the oil, the ester alcohol, the nonionic surfactant, and a polypropylene glycol. In a further embodiment, the oil and the ester alcohol are first mixed together; the nonionic surfactant is then mixed with the oil/ester alcohol mixture; and finally, the polypropylene glycol is mixed with the oil/ester alcohol/nonionic surfactant mixture. In another embodiment of the invention, the fish oil/glycol mixture is prepared by first adding the oil with the nonionic surfactant and then admixing the ester alcohol and finally admixing the polypropylene glycol to the mixture. The mixing of the oil/glycol mixture can be conducted with a high speed dispenser and a shear pump. The mixing step is conducted until the mixture is homogenous.

The nonionic surfactant in the fish oil/glycol mixture is a polyethoxylated glycol and is preferably polyether polyolpoly (oxyethylene-oxy) propylene glycol. The nonionic surfactant can also be a polyethoxylated glycol selected from a group consisting of polybutylene glycol, polyethylene glycol, polypropylene glycol and mixture thereof. The oil in the mixture is preferably fish oil and more preferably menhaden fish oil. The oil can also be selected from a group consisting of animal oil, vegetable oil, mineral oil, synthetic oil, and mixtures thereof. The ester alcohol in the mixture is preferably 2,2,4 trimethyl- 1,3 pentanediol monoisobutyrate. The ester alcohol can also be any alcohol having the formula $C_1-C_{16}$ with straight and/or branched chains.

In a preferred embodiment, the nonionic surfactant is from about 1% to about 90% of the mixture, the oil is from about 5% to about 90% of the mixture, the ester alcohol is from about 1% to about 50% the mixture, and the polypropylene glycol is from about 1% to about 75% of the mixture.

In one embodiment of the invention, the carbon black/asphaltite mixture is prepared by (1) mixing a hydrophobic carbon black with either a surfactant or a dispersant and (2) shearing the mixture in step (1) under a sufficiently high mechanical shear for a sufficient time to convert the hydrophobic carbon black into hydrophilic carbon black.

The preparation of the carbon black/asphaltite mixture further comprises adding hydrophobic asphaltite to the mixture in step (1) and shearing in step (2) the hydrophobic asphaltite to convert it to hydrophilic asphaltite. Lignite is then admixed into the mixture. The asphaltite is gilsonite. The hydrophilic carbon black/asphaltite is of a dimension that enables 99.9% of the carbon black/asphaltite to pass through a 200 mesh shaker screen. The preparation of the carbon black/asphaltite mixture also includes adjusting the pH of the sheared mixture from about 10 to about 12. The surfactant or dispersant in the carbon black/asphaltite mixture is a liquid.

The hydrophobic carbon black and the hydrophobic asphaltite can be sheared under a mechanical shear of at least 10,000/sec for at least 1 hour or 2 hours.

In a further embodiment, the hydrophobic carbon black and hydrophobic asphaltite mixtures can be sheared with a mixer having an impeller tip speed of at least 40 ft/sec and the mixture of step (1) is sheared under mechanical shear of at least 10,000/sec for at least 1 hour or 2 hours.

In a still further embodiment, the hydrophobic carbon black and the hydrophobic asphaltite can be sheared with a mixer operating at 1700 rpm for at least 1 or 2 hours.

In accordance with the present invention of manufacturing a water based drilling fluid additive, hydrophobic carbon black is mixed with a surfactant or dispersant. This mixture is then sheared under a sufficiently high mechanical shear for a sufficient time to convert the hydrophobic carbon black into hydrophilic carbon black.

In one embodiment, hydrophobic asphaltite is mixed with the hydrophobic carbon black and the surfactant or dispersant. Then this mixture is sheared under a sufficiently high mechanical shear for a sufficient time to convert both the hydrophobic carbon black and hydrophobic asphaltite into a hydrophilic carbon black and a hydrophilic asphaltite.

As a result, the surface area of the carbon black is wetted and hydrophilic. This allows the carbon black product to remain dispersed and separated into individual particles which stack or plate out on the side of the well bore to reduce fluid loss. These finely dispersed, surface coated particles act a excellent plugging agents for improved fluid loss control. Similar advantageous properties are imparted to the asphaltite when it is present.

In the present invention, the carbon black particles and asphaltite, if present, are in a state of dispersion having an average particle size much finer than their original size due to the shearing action in the environmental of the surfactant or dispersant. In the present invention, the carbon black particles are in a state of dispersion having an average particle size much finer than the other drilling fluid additives. The carbon black particles, and asphaltite, if present, become dispersed into much finer particles which expose more surface area. This surface area is then exposed to the surfactant or dispersant which converts the hydrophobic asphaltite, it present, into hydrophobic carbon black particles and, hydrophilic asphaltite particles, respectively. The asphaltite and carbon black product thereby readily mixes and disperses with any water based drilling fluid.

Any inherently hydrophobic asphaltite material can be used in the present invention. A high grade mined pulverized gilsonite is preferred.

A more preferred carbon black which can be used in the present invention is carbon black produced by furnace processes that range in size from 8 $m^2$/gr to 150 $m^2$/gr as determined by the nitrogen adsorption method or carbon black ranging in size from 35 cc/100 gram to 200 cc/100 gram as measured by DBP (Dibutylphthalate) absorption method.

A more preferred carbon black which can be used in the present invention is carbon black in the particle size range of 70–120 $m^2$/gram as determined by the nitrogen adsorption method or 75–125 cc/100 grams as determined by the DBP (Dibutylphthalate) absorption method.

Surfactants of the present invention can be selected from, for example ethoxylated phenols, alcohols, glycols, or fatty acid type materials. A preferred surfactant is an ethoxylated glycol type surfactant. Dispersant of the present invention can be selected from, for example, potassium hydroxide, sodium hydroxide, or lignite type materials. The surfactants and dispersants are either liquid or solid but are preferably liquid.

The mixture of the carbon black and the surfactant or dispersant are subjected to an extremely high mechanical shear to impart hydrophilic properties to the carbon black. The mixture should preferably be subjected to a shear of at least 1700 rpms for at least 60 minutes. When present in the mixture, the hydrophobic asphaltite is likewise sheared.

A typical method of shearing the liquid mixture is by using a high speed mechanical disperser such as a ROTOSTAT® 200XP-200, manufactured and sold by Admix, Inc., of Londonberry, N.H., U.S.A.

Optionally, the mixture comprising carbon black obtained after the shearing process may be adjusted to a pH of about 8 before the mixture is added to the drilling mud. The pH adjustment is a means to further disperse the solids of the invention in the liquid phase.

The carbon black is preferably used in an amount of about from 5% to 90% by weight of the additive mixture. About 50% by weight of the carbon black in the additive mixture is especially preferred.

If surfactant is employed, the surfactant is preferably used in an amount of about from 5% to 90% by weight of the additive mixture. About 35% by weight of the surfactant in the additive mixture is especially preferred.

If a dispersant is employed, the dispersant is preferably used in an amount of about from 1% to 50% by weight of the additive mixture. About 10% by weight of the dispersant in the additive mixture is especially preferred.

In one embodiment, the additive material further comprises asphaltite in an amount of about from 5% to 80% by weight of the mixture. About 40–70% by weight of the asphaltite in the additive mixture is especially preferred.

The combination embodiment of utilizing asphaltite particles smaller than 2 microns which would be considered colloidal in size. Not wishing to be bound by theory, it is believed that these colloidal particles function to bridge or plug the micro fractions of the well bore.

The additives mixture is mixed with the drilling mud in an amount to sufficiently reduce fluid loss and wall cake thickness. The additive mixture is preferably used in from about ½% to about 30% by volume of the drilling mud. The additive mixture is more preferably used in from about 2% to about 5% by volume of the drilling mud.

The additive can also include other components that are inherently hydrophobic prior to the shearing step.

The additive can be utilized in drilling fluids while drilling oil wells, gas wells, mineral wells, water wells, or any other earth boring operation.

The specific examples below will enable the invention to be better understood. However, they are given merely by way of guidance and do not imply any limitations.

EXAMPLE 1

Improved Lubricity of the Drilling Fluid System

The following results in Tables 1 and 2 indicate the improvement in lubricating properties of liquid carbon black/asphaltite/lignite blend and fish oil/glycol combination drilling fluid system in two water based field muds verses the lubricity of a base mud without the drilling fluid system. Note that torque readings in the liquid carbon black/asphaltite/lignite blend and fish oil/glycol combination drilling fluid system are significantly lower than the untreated fluid. Table 1 illustrates torque readings of a 13.0 ppg mud and Table 2 illustrate a torque readings of a 15.9 ppg mud.

TABLE 1

IMPROVED LUBRICITY USING LIQUID CARBON BLACK/ASPHALTITE/LIGNITE BLEND AND FISH OIL/GLYCOL COMBINATION DRILLING FLUID SYSTEM ON AN OFI
LUBRICITY METER @ 60 RPM
Torque Readings in 13.0 ppg Mud- Also see FIG. 1

| Pressure in Inch/Pounds Applied | Base Mud | 5% Liquid Carbon Black/Asphaltite/Lignite and Fish Oil/Glycol Combination Drilling Fluid System |
|---|---|---|
| 100 | 16 | 14 |
| 150 | 24 | 21 |
| 200 | 33 | 28 |
| 300 | 50 | 40 |
| 400 | 67 | 49 |
| 500 | 86 | 57 |
| 600 | 106 | 69* |

*NOTE: THE LOWER THE TORQUE, THE GREATER THE LUBRICITY

TABLE 2

IMPROVED LUBRICITY USING LIQUID CARBON BLACK/ASPHALTITE/LIGNITE BLEND AND FISH OIL/GLYCOL COMBINATION DRILLING FLUID SYSTEM ON AN OFI
LUBRICITY METER @ 60 RPM
Torque Readings in 15.9 ppg Mud - Also see FIG. 1

| Pressure in Inch/Pounds Applied | Base Mud | 5% Liquid Carbon Black/Asphaltite/ Lignite and Fish Oil/Glycol Combination Drilling Fluid System |
|---|---|---|
| 100 | 13 | 12 |
| 150 | 19 | 18 |
| 200 | 25 | 23 |
| 300 | 36 | 32 |
| 400 | 47 | 41 |
| 500 | 61 | 49 |
| 600 | 80 | 57* |

*NOTE: THE LOWER THE TORQUE, THE GREATER THE LUBRICITY

Figure 2:
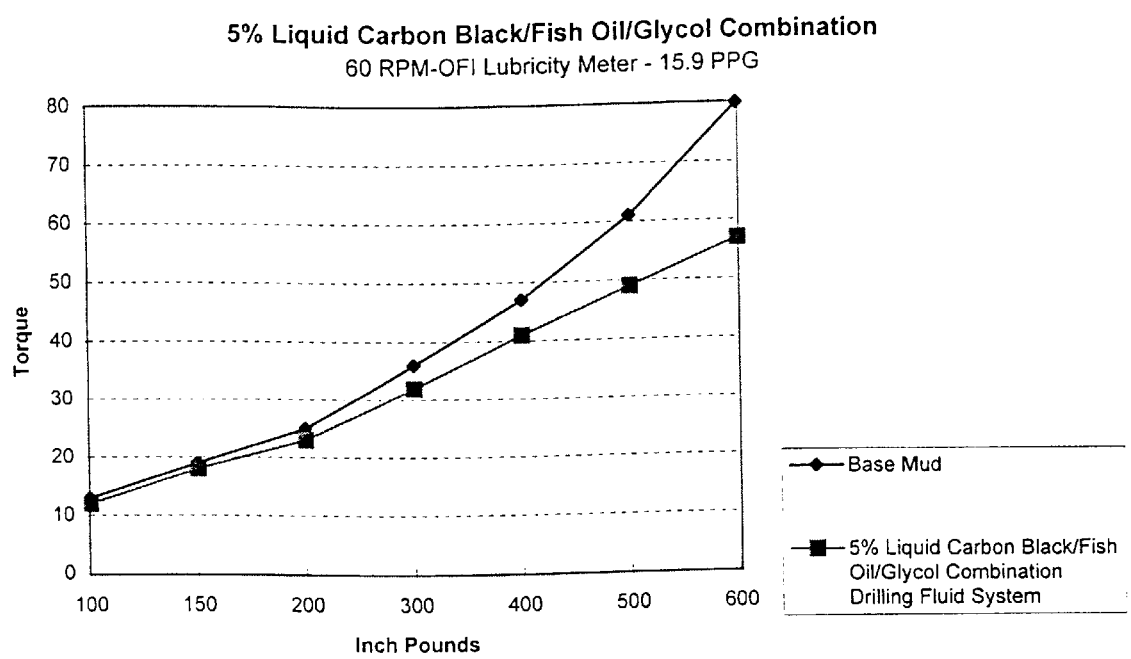
FIG. 2 depicts a graphical representation of base mud in contrast with a base mud containing 5% of the drilling fluid system of the present invention with torque readings on a 15.9 ppg mud.

FIGS. 1 and 2 depict a linear graphic representation of Tables 1 and 2. Both FIGS. 1 and 2 show greater lubricity for muds with the additive of the drilling fluid of the present invention. FIG. 1 provides a torque reading of a 13.0 ppg mud and FIG. 2 provides a torque reading 15.9 ppg mud.

EXAMPLE 2

Improved High Pressure and Temperature Fluid Loss of the Drilling Fluid System

Tables 3 and 4 demonstrate that the liquid carbon black/asphaltite/lignite blend and fish oil/glycol combination drilling fluid system provides a lower high temperature/high pressure fluid loss producing less cc's of filtrate with a filter cake that is lighter in weight and thinner. Table 3 depicts the fluid loss of a 13.0 ppg field mud and Table 4 depicts the fluid loss of a 15.9 field mud.

TABLE 3

30 MINUTE HIGH TEMPERATURE/HIGH PRESSURE FLUID LOSS
@ 250° F.
13.0 ppg Field Mud

| | Base Mud | 5% Liquid Carbon Black/Asphaltite/ Lignite Blend and Fish Oil/Glycol Combination Drilling Fluid System |
|---|---|---|
| Fluid Loss in cc | 17.6 | 7.6 |
| Filter Cake Weight in Grams | 16.6 | 13.5 |
| Filter Cake Thickness in Inches | 5/32" | 3/32" |

TABLE 4

30 MINUTE HIGH TEMPERATURE/HIGH PRESSURE FLUID LOSS
@ 250° F.
15.9 ppg Field Mud

| | Base Mud | 5% Liquid Carbon Black/ Asphaltite/Lignite Blend and Fish Oil/Glycol Combination Drilling Fluid System |
|---|---|---|
| Fluid Loss in cc | 21.6 | 13.4 |
| Filter Cake Weight in Grams | 44.3 | 34.2 |
| Filter Cake Thickness in Inches | 11/32" | 9/32" |

Improved Shale Stability of the Drilling Fluid System

The ability of a product to reduce the swelling and disintegration of shale increases drilling rates and helps produce a "gauged hole". A shale sample from a drilling rig was placed into the base mud from that rig. An additional shale sample was placed into a 5% by volume (total treatment) liquid carbon black/asphaltite/lignite and fish oil/glycol combination drilling fluid system. The shale samples were weighed before and after hot rolling the mud samples at 150° F. for 15 hours and the results recorded. Visual observations were of each shale sample were also performed. The results of these shale studies are listed in Table 5.

TABLE 5

SHALE STABILITY TESTS AFTER HOT ROLLING @ 150° F. FOR 15 HOURS

| | Base Mud | 5% Liquid Carbon Black/Asphaltite/Lignite Blend and Fish Oil/Glycol Combinatian Drilling Fluid System |
|---|---|---|
| Shale Final Weight in Grams | 15.7 | 32.5 |
| Shale Initial Weight in Grams | 35.1 | 39.1 |
| Shale Weight Change in Grams | −19.4 | −6.6 |
| Percent Change in Weight | −55.3 | −16.9 |
| Shale Observations | 40% Remaining | 80% Remaining |

EXAMPLE 4

Enhanced Rate of Penetration of the Drilling Fluid System

The longer the time required to drill to a specified depth, the greater the cost of drilling the oil/gas well. If that time can be reduced significantly, capital outlay can be lowered. The rate of penetration can be enhanced by keeping the Bottom Hole Assembly (BHA) and the drill bit clean. The following data in Tables 6 and 7 indicate that the liquid carbon black/asphaltite/lignite blend and fish oil/glycol combination drilling fluid system increases the rate of penetration significantly:

TABLE 6

DATA ON RATE OF PENETRATION (R.O.P.) ENHANCEMENT BY LIQUID CARBON BLACK/ASPHALTITE/LIGNITE BLEND AND FISH OIL/GLYCOL COMBINATION DRILLING FLUID SYSTEM IN AN OFFSHORE LOUISIANA WELL
15.7 PPG POTASSIUM/SEAWATER/LIGNITE MUD

|  | BEFORE | AFTER %5 LIQUID CARBON BLACK/ASPHALTITE/LIGNITE BLEND AND FISH OIL/GLYCOL COMBINATION DRILLING FLUID SYSTEM |
| --- | --- | --- |
| Depth | 11,252'–11,644' | 11,644–12,424' |
| Footage | 392' | 780' |
| R.O.P. per Day | 98' | 390' |
| HTHP @ 250° F. | 14–15 cc | 8 cc |
| BHA Condition | 100% Balled | 5% Balled |
| Formation | Sticky, plastic gumbo | Sticky, plastic gumbo |

TABLE 7

DATA ON RATE OF PENETRATION (R.O.P) ENHANCEMENT BY LIQUID CARBON BLACK/ASPHALTITE/LIGNITE BLEND AND FISH OIL/GLYCOL COMBINATION DRILLING FLUID SYSTEM IN AN OFFSHORE TEXAS WELL

|  | ESTIMATED | ACTUAL WITH THE 5% LIQUID CARBON BLACK/ASPHALTITE/LIGNITE BLEND AND FISH OIL/GLYCOL COMBINATION DRILLING FLUID SYSTEM |
| --- | --- | --- |
| Drilling Days | 33 | 18 |
| R.O.P. per Hour | 11' | 19' |
| Cost per Foot | $65.12 | $29.96 |
| Footage per Day | 258' | 446' |
| Cost to Drill from est. 3,500' to est. 12,000' | $590,021.93 | $284,349.00 (11,830' total depth) |

Obviously, numerous modifications and variations of the present invention are possible in light of the above teachings. It is therefore to be understood that within the scope of the attendant claims appended hereto, the invention may be practiced otherwise than as specifically disclosed herein.

What is claimed is:

1. A drilling fluid system comprising:
   (a) a hydrophilic clay;
   (b) a pH controller;
   (c) a fluid loss controller;
   (d) a first dispersant;
   (e) a mixture of carbon black, asphaltite, lignite, and either a first surfactant or a second dispersant; and
   (f) a mixture of a second surfactant, an oil, an ester alcohol and polypropylene glycol.

2. The drilling fluid system of claim 1 further comprising a weighting agent, said weighting agent can be selected from a group consisting of barium sulfate, calcium carbonate, and hematite.

3. The drilling fluid system of claim 1 wherein the hydrophilic clay is bentonite.

4. The drilling fluid system of claim 1 wherein the pH controller can be selected from a group consisting of caustic soda, potassium hydroxide, and sodium hydroxide.

5. The drilling fluid system of claim 1 wherein the fluid loss controller is polyacrylamide.

6. The drilling fluid system of claim 1 wherein the first and second dispersant is lignosulfonate.

7. The drilling fluid system of claim 1 wherein the mixture of (e) further comprises a chemical inhibitor, the chemical inhibitor can be selected from a group consisting of gypsum, lime, potassium chloride, potassium hydroxide, and calcium sulfate.

8. The drilling fluid system of claim 1 wherein the asphaltite is gilsonite.

9. The drilling fluid system of claim 1 wherein the surfactant in (e) is selected from a group consisting of phenols, alcohols, glycols, and fatty acid type materials and the dispersant in (e) is selected from a group consisting of potassium hydroxide, and sodium hydroxide.

10. The drilling fluid system of claim 1 wherein the surfactant in (f) is a polyethoxylated glycol and is preferably polyether polyol-poly (oxyethylene-oxy) propylene glycol.

11. The drilling fluid system of claim 1 wherein the surfactant in (f) a polyethoxylated glycol selected from a group consisting of polybutylene glycol, polyethylene glycol, polypropylene glycol and mixtures thereof.

12. The drilling fluid system of claim 1 wherein the oil in (f) is preferably fish oil.

13. The drilling fluid system of claim 12 wherein the fish oil is preferably menhaden fish oil.

14. The drilling fluid system of claim 1 wherein the oil in (f) is selected from a group consisting of animal oil, vegetable oil, mineral oil, synthetic oil and mixtures thereof.

15. The drilling fluid system of claim 1 wherein the ester alcohol in (f) is preferably 2,2,4 trimethyl-1,3 pentanediol monoisobutyrate.

16. The drilling fluid system of claim 1 wherein the ester alcohol in (f) can be an alcohol having the formula $C_1$–$C_{16}$ with straight and/or branched chains.

17. The drilling fluid system of claim 1 wherein the mixture in (e) is from about 1% to about 10% of the drilling fluid system and preferably from about 2% to about 5% of the drilling fluid system.

18. The drilling fluid system of claim 1 wherein the mixture in (f) is from about 1to about 10% of the drilling fluid system and preferably from about 2% to about 5% of the drilling fluid system.

19. The drilling fluid system of claim 1 wherein the surfactant is from about 1% to about 90% of the mixture in (f), the oil is from about 5% to about 90% of the mixture in (f), the ester alcohol is from about 1% to about 50% of the mixture in (f), and the polypropylene glycol is from about 1% to about 75% of the mixture in (f).

20. The drilling fluid system of claim 1 wherein the mixture in (e) is 30–35 parts by weight asphaltite, 15–20 parts by weight carbon black and 5–90 parts by weight of a surfactant are used.

21. A drilling fluid system utilized with a pre-existing water based mud for use in drilling applications, said system comprising:
(a) a mixture of carbon black, asphaltite, and lignite and either a first surfactant or a dispersant; and
(b) a mixture of a second surfactant, an oil, an ester alcohol and polypropylene glycol.

22. The drilling fluid system of claim 21 wherein the asphaltite is gilsonite.

23. The drilling fluid system of claim 21 wherein the surfactant in (a) is selected from a group consisting of phenols, alcohols, glycols, and fatty acid type materials and the dispersant in (a) is selected from a group consisting of potassium hydroxide, and sodium hydroxide.

24. The drilling fluid system of claim 21 wherein the surfactant in (b) is polyethoxylated glycol and is preferably polyether polyol-poly (oxyethylene-oxy) propylene glycol.

25. The drilling fluid system of claim 21 wherein the second surfactant in (b) is selected is a polyethoxylated glycol selected from a group consisting of polybutylene glycol, polyethylene glycol, and mixtures thereof.

26. The drilling fluid system of claim 21 wherein the oil in (b) is preferably fish oil.

27. The drilling fluid system of claim 26 wherein the fish oil is preferably menhaden fish oil.

28. The drilling fluid system of claim 21 wherein the oil in (b) is selected from a group consisting of animal oil, vegetable oil, mineral oil, and synthetic oil, and mixtures thereof.

29. The drilling fluid system of claim 21 wherein the ester alcohol in (b) is preferably 2,2,4 trimethyl-1,3 pentanediol monoisobutyrate.

30. The drilling fluid system of claim 21 wherein the ester alcohol in (b) can be an alcohol having the formula $C_1$–$C_{16}$ with straight and/or branched chains.

31. The drilling fluid system of claim 21 wherein the mixture in (a) is from about 1% to about 10% of the drilling fluid system and preferably from about 2% to about 5% of the drilling fluid system.

32. The drilling fluid system of claim 21 wherein the mixture in (b) is from about 1% to about 10% of the drilling fluid system and preferably from about 2% to about 5% of the drilling fluid system.

33. The drilling fluid system of claim 21 wherein the surfactant is from about 1% to about 90% of the mixture in (b), the oil is from about 5% to about 90% the mixture in (b), the ester alcohol is from about 1% to about 50% of the mixture in (b), and the polypropylene glycol is from about 1% to about 75% of the mixture in (b).

34. The drilling fluid system of claim 21 wherein the mixture in (a) is 30–35 parts by weight asphaltite, 15–20 parts by weight carbon black and 5–90 parts by weight of a surfactant are used.

35. A method of manufacturing a drilling fluid system, said method comprising the steps of:
(a) mixing water with a hydrophilic clay, a weighting agent, a pH controller, a fluid loss controller, and a dispersant;
(b) admixing a mixture of carbon black, asphaltite, and lignite and either a surfactant or a dispersant to the mixture in (a); and
(c) admixing a mixture of a nonionic surfactant, an oil, an ester alcohol and a polypropylene glycol to the mixture of (a) and (b).

36. The method of claim 35 wherein the carbon black mixture of step (b) is prepared by (1) mixing a hydrophobic carbon black with either a surfactant or a dispersant and (2) shearing the mixture in step (1) under a sufficiently high mechanical shear for a sufficient time to convert the hydrophobic carbon black into hydrophilic carbon black.

37. The method of claim 36 wherein step (b) further comprises adding hydrophobic asphaltite to the mixture in step (1) and shearing in step (2) the hydrophobic asphaltite to convert it to hydrophilic asphaltite.

38. The method of claim 37 wherein step (b) further comprises adding lignite to the mixture and shearing the mixture.

39. The method of claim 35 wherein the asphaltite is gilsonite.

40. The method of claim 37 wherein the hydrophilic carbon black/asphaltite is of a dimension that enables 99.9% of the carbon black/asphaltite to pass through a 200 mesh shaker screen.

41. The method of claim 37 further comprising the step of adjusting the pH of the sheared mixture of step (2) is from about 10 to about 12.

42. The method of claim 35 wherein the surfactant or the dispersant in step (b) is a liquid.

43. The method of claim 37 wherein the mixture of step (1) is sheared under a mechanical shear of at least 10,000/sec for at least 1 hour.

44. The method of claim 37 wherein the mixture of step (1) is sheared under a mechanical shear of at least 10,000/sec for at least 2 hours.

45. The method of claim 37 wherein the mixture of step (1) is sheared with a mixer having an impeller tip speed of at least 40 ft/sec and the mixture of step (1) is sheared under mechanical shear of at least 10,000/sec for at least 1 hour.

46. The method of claim 37 wherein the mixture of step (1) is sheared with a mixer having an impeller tip speed of at least 40 ft/sec and the mixture of step (1) is sheared under a mechanical shear of at least 10,000/sec for at least 2 hours.

47. The method of claim 37 wherein the mixture of step (1) is sheared with a mixer operating at 1700 rpm for at least 1 hour.

48. The method of claim 37 wherein the mixture of step (1) is sheared with a mixer operating at 1700 rpm for at least 2 hours.

49. The method of claim 35 wherein the surfactant in step (b) is selected from the group consisting of phenols, alcohols, glycols, and fatty acids type materials and the dispersant is selected from the group consisting of potassium hydroxide, sodium hydroxide and lignite type materials.

50. The method of claim 35 wherein the mixture in (c) is prepared by (1) admixing the ester alcohol, the oil, the nonionic surfactant, and the polypropylene glycol.

51. The method of claim 50 wherein the oil and ester alcohol are first mixed together.

52. The method of claim 51 wherein the nonionic surfactant is then mixed with the oil/ester alcohol mixture.

53. The method of claim 52 wherein the polypropylene glycol is then mixed with the oil/ester alcohol/nonionic surfactant mixture.

54. The method of claim 50 wherein the oil is first mixed with a nonionic surfactant and then the ester alcohol is admixed to the mixture and finally the polypropylene glycol is admixed to the mixture.

55. The method of claim 50 wherein the mixing is conducted with a high speed dispenser and shear pump.

56. The method of claim 50 wherein the mixing step is conducted until the mixture is homogenous.

57. The method of claim 35 wherein the nonionic surfactant in step (c) is a polyethoxylated glycol and is preferably polyether polyol-poly (oxyethylene-oxy) propylene glycol.

58. The method of claim 35 wherein the nonionic surfactant in step (c) is a polyethoxylated glycol selected from a group consisting of polybutylene glycol, polyethylene glycol, polypropylene glycol and mixture thereof.

59. The method of claim 35 wherein the oil in step (c) is preferably fish oil.

60. The method of claim 59 wherein the fish oil is preferably menhaden fish oil.

61. The method of claim 35 wherein the oil in step (c) is selected from a group consisting of animal oil, vegetable oil, mineral oil, synthetic oil, and mixtures thereof.

62. The method of claim 35 wherein the ester alcohol in step (c) is preferably 2,2,4 trimethyl-1,3 pentanediol monoisobutyrate.

63. The method of claim 35 wherein the ester alcohol of step (c) can be an alcohol having the formula $C_1$–$C_{16}$ with straight and/or branched chains.

64. The method of claim 35 wherein the nonionic surfactant is from about 1% to about 90% of the mixture in step (c), the oil is from about 5% to about 90% of the mixture in step (c), the ester alcohol is from about 1% to about 50% the mixture in step (c), and the polypropylene glycol is from about 1% to about 75% of the mixture in step (c).

65. A method of manufacturing a drilling fluid system to be used with a pre-existing water based mud for drilling and excavating applications, said method comprising the steps of:
   a) preparing a mixture of carbon black, asphaltite, lignite, and either a surfactant or a dispersant;
   b) preparing a mixture of a nonionic surfactant, an oil, an alcohol, and polyproplyene glycol; and
   c) adding the mixture of (a) and (b) to a pre-existing water based mud.

66. The method of claim 65 wherein the carbon black mixture of step (b) is prepared by (1) mixing a hydrophobic carbon black with either a surfactant or a dispersant and (2) shearing the mixture in step (1) under a sufficiently high mechanical shear for a sufficient time to convert the hydrophobic carbon black into hydrophilic carbon black.

67. The method of claim 66 wherein step (b) further comprises adding hydrophobic asphaltite to the mixture in step (1) and shearing in step (2) the hydrophobic asphaltite to convert it to hydrophilic asphaltite.

68. The method of claim 67 wherein step (b) further comprises adding lignite to the mixture and shearing the mixture.

69. The method of claim 65 wherein the asphaltite is gilsonite.

70. The method of claim 67 wherein the hydrophilic carbon black/asphaltite is of a dimension that enables 99.9% of the carbon black/asphaltite to pass through a 200 mesh shaker screen.

71. The method of claim 67 further comprising the step of adjusting the pH of the sheared mixture of step (2) is from about 10 to about 12.

72. The method of claim 55 wherein the surfactant or the dispersant in step (b) is a liquid.

73. The method of claim 65 wherein the surfactant in step (b) is selected from the group consisting of phenols, alcohols, glycols, and fatty acids type materials and the dispersant is selected from the group consisting of potassium hydroxide, sodium hydroxide and lignite type materials.

74. The method of claim 65 wherein the mixture in (c) is prepared by (1) admixing the ester alcohol, the oil, the nonionic surfactant, and the polypropylene glycol.

75. The method of claim 74 wherein the oil and ester alcohol are first mixed together.

76. The method of claim 75 wherein the nonionic surfactant is then mixed with the oil/ester alcohol mixture.

77. The method of claim 76 wherein the polypropylene glycol is then mixed with the oil/ester alcohol/nonionic surfactant mixture.

78. The method of claim 74 wherein the oil is first mixed with a nonionic surfactant and then the ester alcohol is admixed to the mixture and finally the polypropylene glycol is admixed to the mixture.

79. The method of claim 74 wherein the mixing is conducted with a high speed dispenser and shear pump.

80. The method of claim 74 wherein the mixing step is conducted until the mixture is homogenous.

81. The method of claim 65 wherein the nonionic surfactant in step (c) is a polyethoxylated glycol and is preferably polyether polyol-poly (oxyethylene-oxy) propylene glycol.

82. The method of claim 65 wherein the nonionic surfactant in step (c) is a polyethoxylated glycol selected from a group consisting of polybutylene glycol, polyethylene glycol, polypropylene glycol and mixture thereof.

83. The method of claim 65 wherein the oil in step (c) is preferably fish oil.

84. The method of claim 83 wherein the fish oil is preferably menhaden fish oil.

85. The method of claim 65 wherein the oil in step (c) is selected from a group consisting of animal oil, vegetable oil, mineral oil, synthetic oil, and mixtures thereof.

86. The method of claim 65 wherein the ester alcohol in step (c) is preferably 2,2,4 trimethyl-1,3 pentanediol monoisobutyrate.

87. The method of claim 65 wherein the ester alcohol of step (c) can be an alcohol having the formula $C_1$–$C_{16}$ with straight and/or branched chains.

88. The method of claim 65 wherein the nonionic surfactant is from about 1% to about 90% of the mixture in step (c), the oil is from about 5% to about 90% of the mixture in step (c), the ester alcohol is from about 1% to about 50% the mixture in step (c), and the polypropylene glycol is from about 1% to about 75% of the mixture in step (c).

89. The drilling fluid system of claim 1 wherein the first dispersant is the same as the second dispersant.

90. The drilling fluid system of claim 1 wherein the first surfactant is the same as the second surfactant.

91. The drilling fluid system of claim 1 wherein the second surfactant is a nonionic surfactant.

92. The drilling fluid system of claim 21 wherein the first surfactant is the same as the second surfactant.

93. The drilling fluid system of claim 21 wherein the second surfactant is a nonionic surfactant.

* * * * *

UNITED STATES PATENT AND TRADEMARK OFFICE
CERTIFICATE OF CORRECTION

PATENT NO.    : 5,843,872
DATED         : December 1, 1998
INVENTOR(S)   : Rayborn, Jerry Sr, et al It is certified that error appears in the above-indentified patent and that said Letters Patent is hereby corrected as shown below:

On the title page: Item [73] Assignee:

Please insert the following:

Assignee:

Sun Drilling Products Corp.
503 Main Street
Belle Chasse, LA 70037

Signed and Sealed this

Twelfth Day of October, 1999

Attest:

Q. TODD DICKINSON

*Attesting Officer*        *Acting Commissioner of Patents and Trademarks*